United States Patent
Bergman

(10) Patent No.: US 9,660,484 B2
(45) Date of Patent: May 23, 2017

(54) POWER DISTRIBUTION UNIT INRUSH CURRENT MONITOR AND METHOD FOR PROTECTING AN UNINTERRUPTIBLE POWER SUPPLY FROM INRUSH CURRENT

(71) Applicant: On Power Systems, Perry Hall, MD (US)

(72) Inventor: Joseph Bergman, Mount Juliet, TN (US)

(73) Assignee: On Power Systems, Perry Hall, MD (US)

( * ) Notice: Subject to any disclaimer, the term of this patent is extended or adjusted under 35 U.S.C. 154(b) by 495 days.

(21) Appl. No.: 14/247,820

(22) Filed: Apr. 8, 2014

(65) Prior Publication Data
US 2015/0288222 A1    Oct. 8, 2015

(51) Int. Cl.
*H02J 9/06* (2006.01)
*H02M 1/32* (2007.01)

(52) U.S. Cl.
CPC .............. *H02J 9/06* (2013.01); *H02M 1/32* (2013.01); *Y10T 307/615* (2015.04)

(58) Field of Classification Search
CPC ........ H02J 9/06; H02J 9/061; H02J 2009/068; Y10T 307/615; Y10T 307/625; G06F 1/3287
See application file for complete search history.

(56) References Cited

U.S. PATENT DOCUMENTS

| | | | |
|---|---|---|---|
| 6,680,547 B1 * | 1/2004 | Dailey | H02J 3/28 307/24 |
| 8,110,946 B2 | 2/2012 | Morishima | |
| 8,125,102 B2 | 2/2012 | Cohen et al. | |
| 8,237,426 B2 | 8/2012 | Chen et al. | |
| 8,299,648 B2 | 10/2012 | Morishima et al. | |
| 8,853,887 B2 * | 10/2014 | Silberbauer | H02J 9/06 307/64 |
| 8,907,520 B2 * | 12/2014 | Chapel | H02J 9/06 307/23 |
| 8,957,547 B2 * | 2/2015 | Chang | H02J 9/061 307/64 |
| 9,287,715 B2 * | 3/2016 | Yuasa | H02J 4/00 |

* cited by examiner

*Primary Examiner* — Ryan Johnson
(74) *Attorney, Agent, or Firm* — Grossman Tucker Perreault & Pfleger, PLLC

(57) ABSTRACT

A power distribution unit (PDU) inrush current monitor (PICM) may be used to protect an uninterruptible power supply (UPS) from an inrush current from a PDU. In general, the PICM senses a power condition of the PDU (e.g., energized or de-energized) and places the UPS in the appropriate operational state or mode (e.g., a stop mode or a run mode) to avoid an inrush current to the UPS when the PDU is powered on and energized. The PICM thus protects the UPS while allowing the UPS to operate when needed. In one embodiment, the PICM provides a stop signal to the UPS to place the UPS into a stop mode while the PDU is de-energized and provides a run signal to the UPS to place the UPS into a run mode after the PDU is energized.

17 Claims, 3 Drawing Sheets

POWER DISTRIBUTION UNIT INRUSH CURRENT MONITOR AND METHOD FOR PROTECTING AN UNINTERRUPTIBLE POWER SUPPLY FROM INRUSH CURRENT

TECHNICAL FIELD

The present disclosure relates to power supply and distribution to electronic devices. More particularly, the present disclosure relates to a power distribution unit inrush current monitor and method for protecting an uninterruptible power supply (UPS) from inrush current caused by a power distribution unit (PDU).

BACKGROUND INFORMATION

With an increasing reliance on extensive and sophisticated electronic equipment (e.g., computers, data centers, and telecommunication equipment), properly distributing electric power and providing electric power with minimal interruptions have become increasingly important. A power distribution unit (PDU) is often used to distribute electric power to a range of electronic equipment. An uninterruptible power supply (UPS) is often used to provide backup power almost instantaneously when a main power source fails. Although these existing devices each serve a purpose for properly powering electronic equipment, interaction between these devices may present problems when they are used together. In particular, powering on a PDU may cause large inrush currents, which may damage a UPS when the UPS is operational and exposed to the inrush current. Damage to the UPS may result in significant downtime and repair costs.

BRIEF DESCRIPTION OF THE DRAWINGS

These and other features and advantages will be better understood by reading the following detailed description, taken together with the drawings wherein.

DETAILED DESCRIPTION

A power distribution unit (PDU) inrush current monitor (PICM), consistent with embodiments of the present disclosure, may be used to protect an uninterruptible power supply (UPS) from an inrush current from a PDU. In general, the PICM senses a power condition of the PDU (e.g., energized or de-energized) and places the UPS in the appropriate operational state or mode (e.g., a stop mode or a run mode) to avoid an inrush current to the UPS when the PDU is powered on and energized. The PICM thus protects the UPS while allowing the UPS to operate when needed. In one embodiment, as will be described in greater detail below, the PICM provides a stop signal to the UPS to place the UPS into a stop mode while the PDU is de-energized and provides a run signal to the UPS to place the UPS into a run mode after the PDU is energized.

As used herein, "stop mode" refers to a mode of a UPS in which the UPS is not operably connected to a load (e.g., the PDU). In a "stop mode," a main power supply bypasses the UPS and the UPS will not supply backup electric power in the event that the main power fails. A "stop mode" may also be referred to as, for example, an offline mode or a bypass mode. A "stop signal" refers to any type of action or physical phenomena capable of causing a response in the UPS placing the UPS in the stop mode. As used herein, "run mode" refers to a mode of a UPS in which the UPS is operably connected to the load (e.g., the PDU). In a "run mode," the main power is supplied via the UPS and the UPS supplies backup electric power in the event that the main power fails. A "run signal" refers to any type of action or physical phenomena capable of causing a response in the UPS placing the UPS in the run mode.

Figure 1:
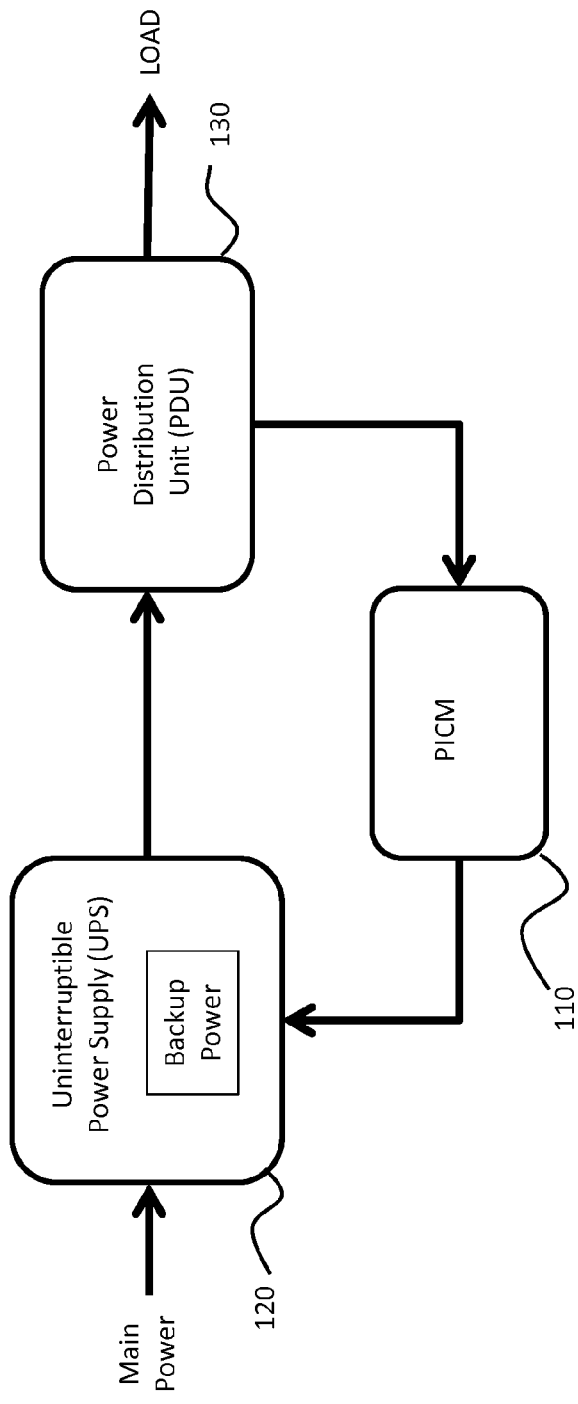
FIG. 1 is a diagrammatic view of a PDU inrush current monitor (PICM) electrically connected between an uninterruptible power supply (UPS) and a power distribution unit (PDU), consistent with embodiments of the present disclosure.

Referring to FIG. 1, a PICM 110, consistent with embodiments of the present disclosure, is coupled between an uninterruptible power supply (UPS) 120 and a power distribution unit (PDU) 130. The UPS 120 supplies electric power (e.g., from an external main power source or from an internal backup power source) to a load via the PDU 130. The PDU 130 distributes the electric power between various electronic equipment (i.e., the load) such as computers, data centers, and telecommunications equipment. When the PDU 130 is powered on to supply the electric power from the main power source to the electronic equipment, an inrush current may be caused as a result of a transformer in the PDU 130 being energized. The PICM 110 protects the UPS 120 from this inrush current caused by the PDU 130 by placing the UPS 120 in different operational modes in response to sensing power conditions in the PDU 130.

In a run mode, the UPS 120 is operably connected to the PDU 130 such that electric power is supplied from the external main power source when available and electric power is supplied from the internal backup power source when the main power source fails. When the UPS 120 is in the run mode and the main power is supplied through the UPS 120, the UPS 120 may be exposed to the inrush current caused when the PDU 130 is powered on. In a stop mode, the UPS 120 is not operably connected to the PDU 130 such that power from the external main power source bypasses the UPS 120 and the UPS 120 does not supply the backup power in the event of a main power failure. When the UPS 120 is in the stop mode, therefore, the UPS 120 is not exposed to the inrush current from the PDU 130.

The PICM 110 monitors the PDU 130 to sense if the PDU 130 is powered on and energized or powered off and de-energized. If the PICM 110 senses that the PDU 130 is powered off and de-energized, the PICM 110 places the UPS 120 in the stop mode. If the PICM 110 senses that the PDU 130 is powered on and energized, the PICM 110 places the UPS 120 in the run mode. By the time that the PICM 110 senses that the PDU 130 is energized and places the UPS 120 in the run mode, the inrush current will have already passed. Thus, the UPS 120 is not exposed to the inrush current that occurs when the PDU 130 is powered on.

In some embodiments described in greater detail below, the PICM 110 may be coupled to the PDU 130 with an electrical connection to monitor and sense the power condition of the PDU 130. In other embodiments, the PICM 110 may be coupled to the PDU 130 using other types of connections or communication capable of monitoring a power condition. In some embodiments described in greater detail below, the PICM 110 may be coupled to the UPS 120 with an electrical connection to send the stop signal and run signal. In other embodiments, the PICM 110 may be coupled to the UPS 120 using other types of connections or communication capable of sending signals such as, for example, a wireless connection.

The PICM 110 may be capable of being used with different mains power systems with different power parameters used in the electric power industry including, without limitation, both single-phase power and three-phase power, both 50 Hz and 60 Hz frequencies, and output voltages of 208V, 380V, 400V, 480V and 600V. The UPS 120 may include a backup power source such as a battery and circuitry capable of detecting a failure in the main power source and switching to the backup power source nearly instantaneously in response to failure of the main power source. One example of a UPS that may be used with the PICM 110 is a G8000 UPS available from Toshiba. The PDU 130 may include any PDU capable of distributing power from a single power source to multiple pieces of electronic equipment via multiple outlets. One example of a PDU that may be used with the PICM 110 is a ISOTRAN PDU available from TEAL. The PICM 110 may also be used with other types of UPSs and PDUs known to one of ordinary skill in the art.

Figure 2:
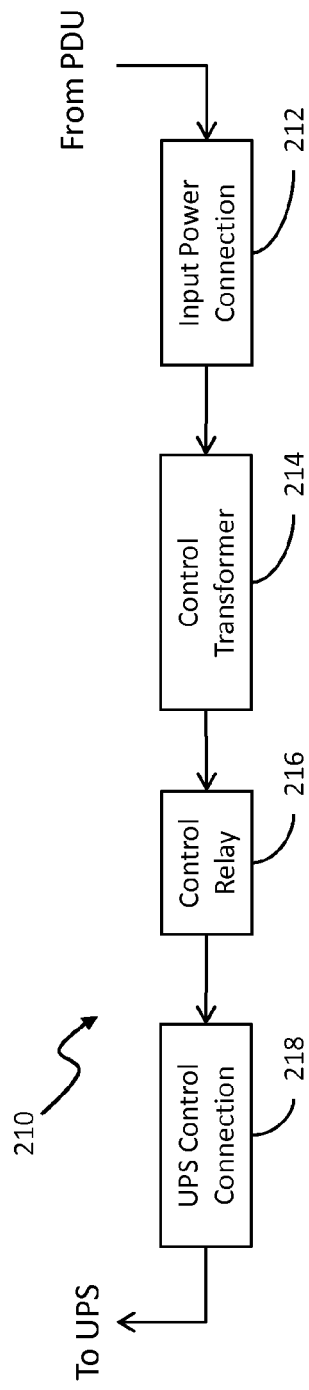
FIG. 2 is a diagrammatic view of an embodiment of a PICM that may be used in the system shown in FIG. 1.

Referring to FIG. 2, an embodiment of a PICM 210 may include an input power connection 212 for electrically connecting to a PDU to receive a voltage from the PDU when the PDU is energized and a UPS control connection 218 for electrically connecting a UPS to signal the UPS in response to the voltage received from the PDU. The PICM 210 also includes a control transformer 214 for receiving the input voltage from the PDU and a control relay 216 for causing stop and run signals to be sent to a UPS via the control connection 218 and in response to the input voltage. In other embodiments, other types of devices may be used to sense that the PDU is energized and to signal the UPS to place the UPS into a stop mode or a run mode.

The control transformer 214 may be a control transformer known to those skilled in the art to step down or reduce high source voltages to control circuits. The input power connection 212 may be electrically connected to the control transformer 214 and the PDU such that the control transformer 214 is energized with the input voltage when the PDU is energized. The control transformer 214 may include a primary winding that receives the input voltage from the PDU via the input power connection 210 and a secondary winding to provide a stepped down voltage to the control relay 216. The control transformer 214 is thus capable of receiving a high voltage input from the PDU when the PDU is energized (i.e., originating from the mains power source) and providing a constant, controlled voltage output for use in monitoring the PDU.

The control relay 216 may be a control relay known to those skilled in the art to open and close a circuit in response to an energizing voltage. The control relay 216 may be electrically connected to the control transformer 214 such that the control relay 216 is energized when the control transformer 214 is energized with the input voltage from the PDU. The control relay 216 is also operably coupled to the UPS control connection 218 to provide the stop signal and the run signal to the UPS, for example, by switching signal or control circuits. When the control relay 216 is not energized, for example, the control relay 216 may close a circuit that results in the stop signal to the UPS. When the control relay 216 is energized, the control relay 216 may close a circuit that results in the run signal to the UPS.

Figure 3:
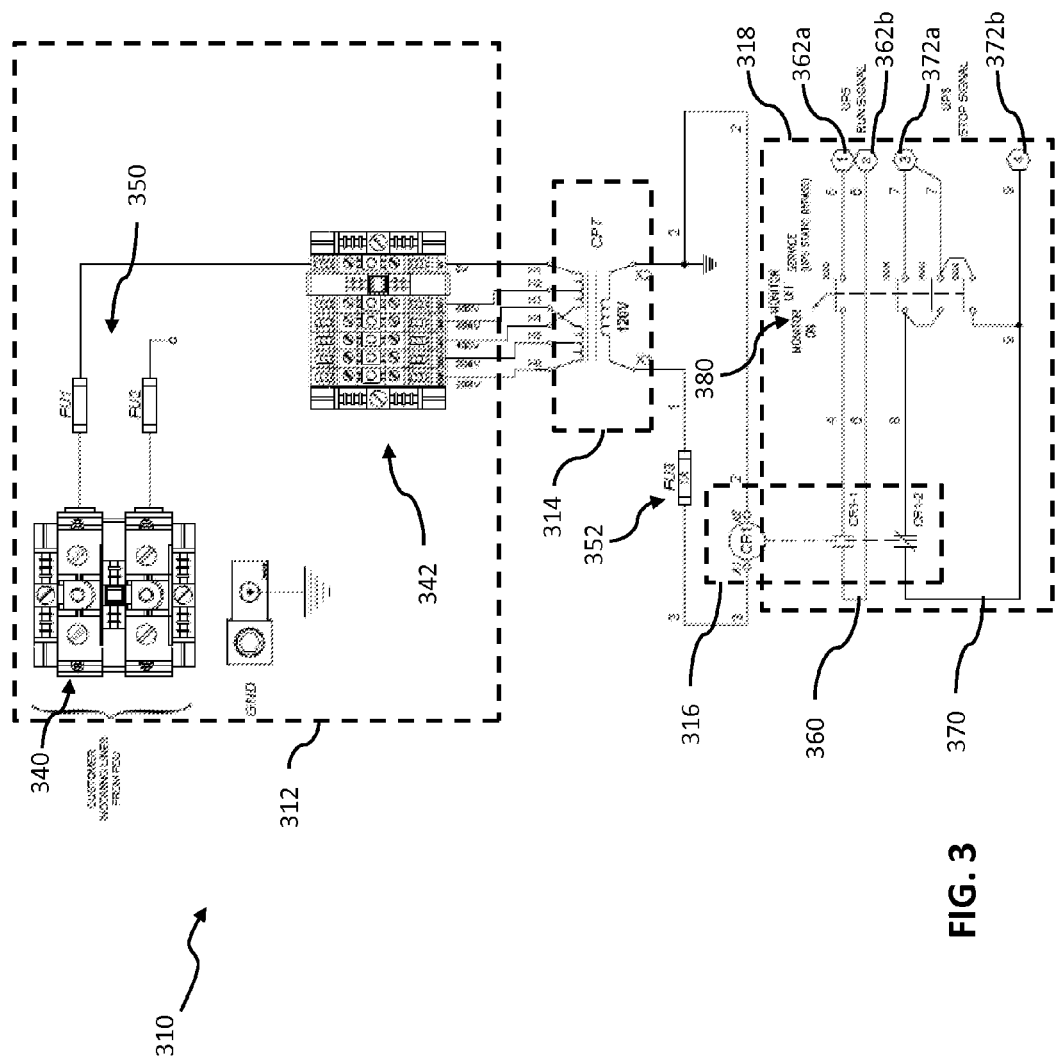
FIG. 3 is a schematic diagram of another embodiment of a PICM that may be used in the system shown in FIG. 1.

Referring to FIG. 3, another embodiment of a PICM 310 is shown and described in greater detail. In this embodiment, an input power connection 312 of the PICM 310 includes input terminals 340 for connecting to customer incoming power lines from a PDU and a voltage selection terminal 342 electrically connected to the input terminals 340. Two wires or cables, such as 6 AWG power cables, may be run from the output of a transformer in the PDU to the input terminals 340. Although two input terminals are shown for connecting to two wires or power cables running from the PDU, other numbers of terminals and wires may be used. The voltage selection terminal 342 is configured to select the correct voltage corresponding to the PDU output voltage and provides an output for the selected voltage. In the illustrated embodiment the voltage selection terminal 342 provides voltage outputs for 208V, 380V, 400V, 480V, and 600V; however, other voltage outputs are possible.

A control transformer 314 is electrically connected to each output of the voltage selection terminal 342 and receives the selected voltage at the primary winding when the PDU transformer is energized. One example of the control transformer 314 is a Series DL control transformer available from Transfab Magnetic Solutions. The control transformer 314 steps down the voltage received at the primary winding and provides an output voltage at the secondary winding. Thus, the presence of the output voltage at the secondary winding of the control transformer 314 indicates that the PDU transformer is energized. In the illustrated embodiment, the control transformer 314 is rated for the possible input voltages (e.g., 208V, 380V, 400V, 480V, and 600V) and an output voltage of 120V. Other control transformers may also be used.

A control relay 316 is electrically connected to the secondary winding of the control transformer 314 such that the control relay 316 is energized when the control transformer 340 is energized. One example of the control relay 316 is a plug-in relay available from Schneider Electric. In the illustrated embodiment, the control relay 316 is rated for 15 A and 120V. Other control relays may also be used. The control relay 316 is also coupled to a UPS control connection 318 and causes the UPS control connection 318 to send the stop signal and run signal to the UPS, as will be described in greater detail below.

In the illustrated embodiment, the UPS control connection 318 includes a run signal circuit 360 with run signal terminals 362*a*, 362*b* and a stop signal circuit 370 with stop signal terminals 372*a*, 372*b*. The UPS control connection 318 may be electrically connected to the UPS, for example, by running two wires from the run signal terminals 362*a*, 362*b* to a corresponding run control circuit in the UPS and running two wires from the stop signal terminals 372*a*, 372*b* to a corresponding stop control circuit in the UPS. A run signal is sent when the run signal circuit 360 is closed and a stop signal is sent when the stop signal circuit 370 is closed. In particular, when the control relay 316 is de-energized (e.g., when the PDU and the control transformer 314 are de-energized), the control relay 316 opens the run signal circuit 360 and closes the stop signal circuit 370. When the control relay 316 is energized (e.g., when the PDU and the control transformer 314 are energized), the control relay 316 closes the run signal circuit 360 and opens the stop signal circuit 370. By the time the control relay 314 is energized by the voltage from the PDU transformer and the UPS goes into run mode in response to a run signal (e.g., several seconds), the inrush current has already passed. In the illustrated embodiment, the control relay 316 may be a double pole double throw relay coupled to both the PICM run signal circuit 360 and the PICM stop signal circuit 370 to provide switching in both circuits 360, 370.

In the illustrated embodiment, the UPS control connection 318 further includes a PICM operation switch 380 coupled to the run signal circuit 360 and the stop signal circuit to set the operational status of the PICM 310. In particular, the PICM operation switch 380 has an on position, an off position and a service/UPS static bypass position. In the on position, the run signal circuit 360 and the stop signal circuit 370 operate normally, as discussed above, by closing the run signal circuit 360 when the PDU energized (i.e., sending a run signal) and closing the stop signal circuit 370 when the PDU is de-energized (i.e., sending a stop signal). In the off position, the PICM 310 is offline with both the run signal circuit 360 and the stop signal circuit 370 open (i.e., no run or stop signals are sent). In the service/UPS static bypass position, the run signal circuit 360 remains open preventing the UPS from being placed in run mode and the stop signal circuit 370 remains closed holding the UPS in stop mode regardless of the PDU being energized or de-energized.

The PICM 310 may also include fuses to protect the PICM from faults. In the illustrated embodiment, for example, fuses 350 are connected between the input terminals 340 and the voltage selection terminals 342 for protecting the PICM from faults on the primary side of the control transformer 314. A fuse 352 is connected between the control transformer 314 and the control relay 316 to protect the control relay 316 from faults on the secondary side of the control transformer. The fuses 350 may be type CC time delay fuses sized for different input voltages and the fuse 352 may be a type CC time delay fuse sized for the largest possible voltage (e.g., 600V) and may be located in finger safe type CC fuse blocks.

Figure 4:
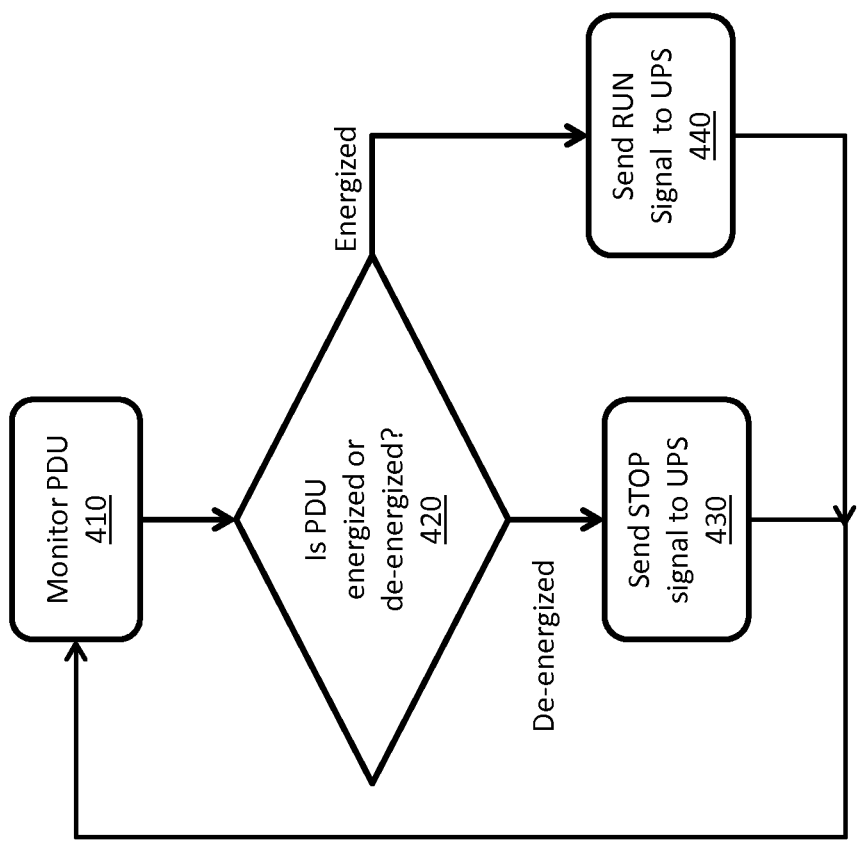
FIG. 4 is a flowchart illustrating a method for protecting an uninterruptible power supply (UPS) from an inrush current from a power distribution unit (PDU), consistent with an embodiment.

FIG. 4 illustrates a method, consistent with embodiments of the present disclosure, for protecting a UPS from an inrush current caused by energizing a PDU. This method may be performed using any of the embodiments of the PICM described above or any other embodiments within the scope of the present disclosure.

The method includes monitoring a power condition 410 of the PDU to determine if the PDU is energized or de-energized 420. As discussed above, the monitoring may be performed by establishing an electrical connection with an output of a transformer in the PDU and receiving a voltage from the PDU transformer when the PDU transformer is energized. In some embodiments, as described above, a control transformer and a control relay may be used to respond to the energization of the PDU transformer and thus to determine that the PDU transformer is energized or de-energized.

The method also includes sending a stop signal 430 to the UPS in response to determining that the PDU is de-energized and sending a run signal 440 to the UPS in response to determining that the PDU is energized. The stop signal places the UPS in a stop mode such that UPS is not operably connected and exposed to an inrush current from the PDU and the run signal places the UPS in a run mode such that the UPS is operably connected and capable of providing uninterrupted power. As discussed above, the stop and run signals may be sent by closing respective stop and run signal circuits that are electrically connected to the UPS. In some embodiments, as described above, a control relay operates to close and open the stop and run signal circuits when the control relay is energized and de-energized in response to the PDU being energized and de-energized.

By placing the UPS in a stop mode when the PDU is de-energized, the UPS will not be exposed to the inrush current that occurs when the PDU is powered on and energized. The method may continuously monitor the PDU and change the operational mode of the UPS as the PDU changes between energized and de-energized states to provide continuous protection against inrush currents.

Accordingly, systems and methods, consistent with embodiments described herein, may be used to protect a UPS from an inrush current caused by energizing a PDU, thereby avoiding significant damage to the UPS and significant downtime.

Consistent with an embodiment, a PDU inrush current monitor (PICM) includes an input power connection for connecting to a power distribution unit (PDU) and receiving electric power from the PDU when the PDU is energized. The PICM also includes a control transformer electrically connected to the input power connection such that the control transformer is energized when the PDU is energized and a control relay electrically connected to the control transformer such that the control relay is energized when the control transformer is energized. The PICM further includes a UPS control connection coupled to the control relay and for connecting to an uninterruptible power supply (UPS). The UPS control connection is configured to send a STOP signal to the UPS when the control relay is not energized, and the UPS control connection is configured to send a RUN signal to the UPS when the control relay is energized.

Consistent with another embodiment, a system includes an uninterruptible power supply (UPS), a power distribution unit (PDU), and a PDU current inrush monitor (PICM) electrically connected to the UPS and the PDU. The PICM is configured to monitor a power condition of the PDU to determine if the PDU is energized or de-energized. The PICM is also configured to send a STOP signal to the UPS to place the UPS in a STOP mode in response to determining that the PDU is de-energized. The PICM is further configured to send a RUN signal to the UPS to place the UPS in a RUN mode in response to determining that the PDU is energized.

Consistent with a further embodiment, a method is provided for protecting an uninterruptible power supply (UPS) from an inrush current caused by energizing a power distribution unit (PDU). The method includes: monitoring a power condition of a PDU to determine if the PDU is energized or de-energized; sending a STOP signal to a UPS in response to determining that the PDU is de-energized to place the UPS in a STOP mode; and sending a RUN signal to the UPS in response to determining that the PDU is energized to place the UPS in a RUN mode.

The terms and expressions which have been employed herein are used as terms of description and not of limitation, and there is no intention, in the use of such terms and expressions, of excluding any equivalents of the features shown and described (or portions thereof), and it is recognized that various modifications are possible. For example, the exemplary circuitry and elements can be implemented in different ways to provide the functionality described herein. Other modifications, variations, and alternatives are also possible.

What is claimed is:
1. A PDU inrush current monitor (PICM) comprising:
   an input power connection for connecting to a power distribution unit (PDU) and receiving electric power from the PDU when the PDU is energized;
   a control transformer electrically connected to the input power connection such that the control transformer is energized when the PDU is energized;

a control relay electrically connected to the control transformer such that the control relay is energized when the control transformer is energized; and a UPS control connection coupled to the control relay and for connecting to an uninterruptible power supply (UPS), wherein the UPS control connection is configured to send a STOP signal to the UPS when the control relay is not energized and wherein the UPS control connection is configured to send a RUN signal to the UPS when the control relay is energized.

2. The PICM of claim 1, wherein PICM is configured to operate in a UPS static bypass mode such that the PICM maintains a stop signal to the UPS even if the PDU is energized.

3. The PICM of claim 1, wherein the input power connection includes input terminals for connecting to the PDU and voltage selection terminals for selecting one of a plurality of voltages corresponding to a PDU output voltage.

4. The PICM of claim 1, wherein the UPS control connection includes a run signal circuit and a stop signal circuit, and wherein the control relay is operably coupled to the run signal circuit such that the control relay closes the run signal circuit when the control relay is energized, and wherein the control relay is operably coupled to the stop signal circuit such that the control relay closes the stop signal circuit when the control relay is not energized.

5. The PICM of claim 1, wherein the UPS control connection includes a PICM operation switch configured to set an operational status of the PICM, wherein the operational status of the PICM includes on and off.

6. The PICM of claim 5, wherein the operational status of the PICM includes UPS static bypass such that the PICM maintains a stop signal to the UPS.

7. A system comprising:
an uninterruptible power supply (UPS);
a power distribution unit (PDU); and
a PDU inrush current monitor (PICM) electrically connected to the UPS and the PDU, wherein the PICM is configured to monitor, at an output of the PDU, a power condition of the PDU to determine if the PDU is energized or de-energized, wherein the PICM is configured to send a STOP signal to the UPS to place the UPS in a STOP mode in response to determining that the PDU is de-energized, and wherein the PICM is configured to send a RUN signal to the UPS to place the UPS in a RUN mode in response to determining that the PDU is energized.

8. The system of claim 7, wherein PICM is configured to operate in a UPS static bypass mode such that the PICM maintains a stop signal to the UPS even if the PDU is energized.

9. The system of claim 7, wherein the PICM comprises:
an input power connection for connecting to the PDU and receiving electric power from the PDU when the PDU is energized;
a control transformer electrically connected to the input power connection such that the control transformer is energized when the PDU is energized;

a control relay electrically connected to the control transformer such that the control relay is energized when the control transformer is energized; and a UPS control connection coupled to the control relay and for connecting to the UPS, wherein the UPS control connection is configured to send the STOP signal to the UPS when the control relay is not energized and configured to send the RUN signal to the UPS when the control relay is energized.

10. The system of claim 9, wherein the input power connection includes input terminals for connecting to the PDU and voltage selection terminals for selecting one of a plurality of voltages corresponding to a PDU output voltage.

11. The system of claim 9, wherein the UPS control connection includes a run signal circuit and a stop signal circuit, and wherein the control relay is operably coupled to the run signal circuit such that the control relay closes the run signal circuit when the control relay is energized, and wherein the control relay is operably coupled to the stop signal circuit such that the control relay closes the stop signal circuit when the control relay is not energized.

12. The system of claim 9, wherein the UPS control connection includes a PICM operation switch configured to set an operational status of the PICM, wherein the operational status of the PICM includes on and off.

13. The system of claim 12, wherein the operational status of the PICM includes UPS static bypass such that the PICM maintains a stop signal to the UPS.

14. A method for protecting an uninterruptible power supply (UPS) from an inrush current caused by energizing a power distribution unit (PDU), the method comprising:
monitoring, at an output of the PDU, a power condition of the PDU to determine if the PDU is energized or de-energized;
sending a STOP signal to a UPS in response to determining that the PDU is de-energized to place the UPS in a STOP mode; and
sending a RUN signal to the UPS in response to determining that the PDU is energized to place the UPS in a RUN mode.

15. The method of claim 14, wherein monitoring a power condition includes energizing a control transformer with a voltage received from the PDU when the PDU is energized and energizing a control relay in response to energizing the control transformer.

16. The method of claim 14, wherein sending the stop signal includes closing a stop signal circuit electrically connected to the UPS, and wherein sending the run signal includes closing a run signal circuit electrically connected to the UPS.

17. The method of claim 16, wherein the stop signal circuit and the run signal circuit are closed by a control relay, and wherein monitoring a power condition includes energizing the control relay in response to energizing the PDU.

* * * * *